May 19, 1953 L. J. EPPINGER 2,638,698
FISH LURE
Filed Feb. 15, 1950

Inventor
Louis J. Eppinger
Barthel & Bugbee
Attorneys

Patented May 19, 1953

2,638,698

UNITED STATES PATENT OFFICE 2,638,698

FISH LURE

Louis J. Eppinger, Detroit, Mich.

Application February 15, 1950, Serial No. 144,315

3 Claims. (Cl. 43—42.03)

This invention relates to fish lures.

One object of this invention is to provide a fish lure having a wobble member which wobbles to and fro as the lure is drawn through the water, thereby imparting an additional flashing appearance to the bait which attracts fish.

Another object is to provide a fish lure of the foregoing character having a spinner associated therewith, the wobble member reflecting and flashing the light reflected off the spinner as the lure is drawn through the water.

Figure 1:
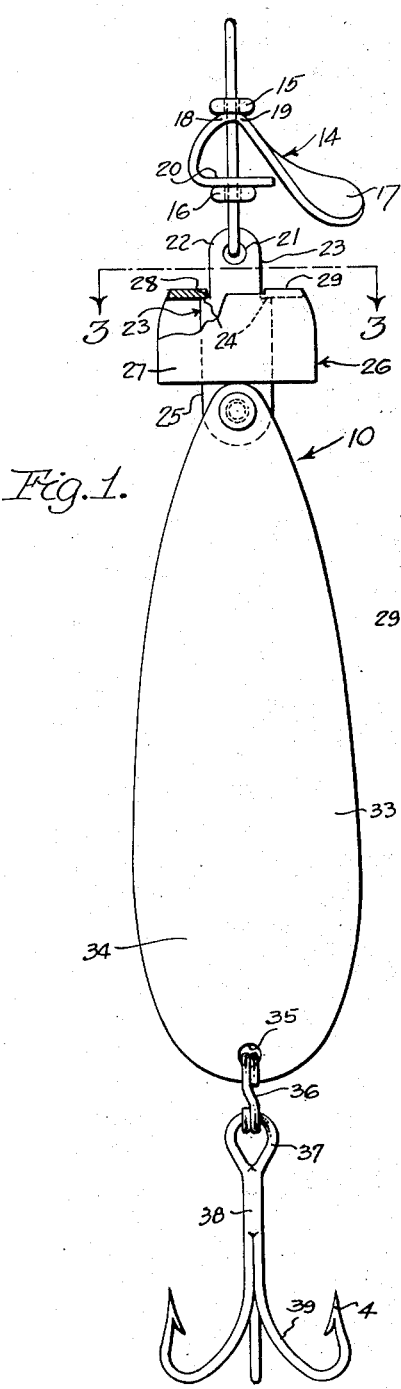
Figure 1 is a top plan view, partly in section, of a fish lure according to one form of the invention.

Referring to the drawings in detail, Figure 1 shows a fish lure, generally designated 10, according to one form of the invention as consisting of an elongated member 11 of wire or other suitable material having eyes 12 and 13 at its forward and rearward ends respectively and a spinner 14 mounted between them and rotatably assisted by bearing beads or collars 15 and 16. The spinner 14 has an angled propeller-like blade 17 extending outwardly from the hub 18 of approximately triangular cross-section having a forward portion 19 engageable with the collar 15 and a flat rearward portion 20 engageable with the collar 16 so as to space the collars 15 and 16 apart from one another and thereby provide a wide separation thereof for good spinning action. The forward and rearward portions 19 and 20 of the hub 18 are of course bored for the passage of the elongated member 11.

Figure 3:
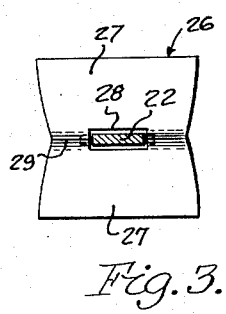
Figure 3 is a section on the line 3—3 of Figure 1.
Figure 2:
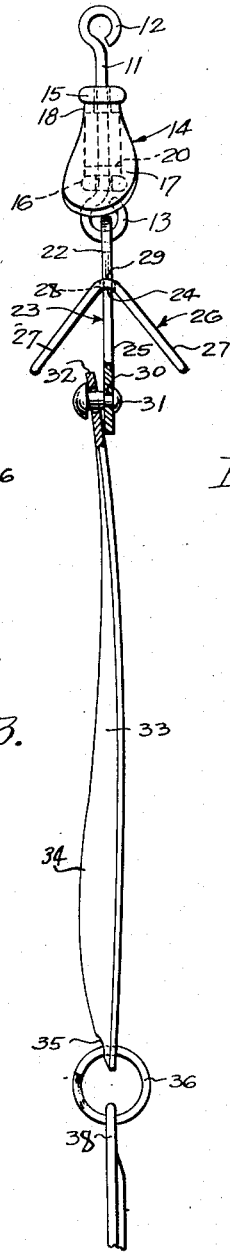
Figure 2 is a side elevation, partly in section, of the fish lure shown in Figure 1.

Connected to the eye 13 at the rearward end of the elongated member 11 as at the hole 21 is the reduced width nose portion 22 of a substantially flat supporting link 23 having shoulders 24 between the nose portion 22 and the rearward portion 25 of the link 23. Loosely mounted on the nose portion 22 and abutting the shoulders 24 is a wobble member 26 having an elongated rectangular aperture 29 extending transversely therein for the passage of the nose portion 22 (Figure 3). The wobble member 26 is approximately V-shaped in side elevation (Figure 2) with substantially flat diverging wings 27, and has the aperture 28 at its apex 29. The aperture 28 is sufficiently larger than the nose portion 22 to provide a clearance therebetween which is sufficient for ample play of the wobble member 26 as it wobbles to and fro relatively to the link 23. The rearward end of the link 23 is provided with a hole 30 to receive a fastener 31, such as a rivet, which passes through an aperture 32 in the forward end of a lure body 33. The lure body is shown in the form of a so-called spoon with a dished or concavo-convex portion 34 terminating at its rearward end in a hole 35. The hole 35 receives a connection ring 36 of the key ring type which passes through the eye 37 in the shank 38 of a hook 39 having barbed points 40 thereon.

In the use of the invention, a fishing line (not shown) is attached to the forward eye 12 on the supporting member 11, preferably with a conventional swivel therebetween, and with or without a gut or wire leader, as the fisherman's desires may dictate. The lure 10 may be either used in casting or trolling, as desired. In either case, when it is drawn through the water, the spinner 14 rotates around the supporting member 11 and provides a glittering appearance by reason of the light reflected off its blade 17. At the same time, the wobble member 26 wobbles or rocks to and fro on the link 23 against its shoulders 24 and reflects light with a flashing appearance. For the most efficient action, of course, the spinner 14 and wobble member 26 are made of highly reflecting material or coated therewith, such as with a chromium plating. Thus, the wobble member 26, as it rocks to and fro, not only reflects light received directly by its wings 27 but also light reflected off the blade 17 of the spinner 14. More light is reflected off the lure body 33 and particularly off its spoon portion 34, which is likewise made of or coated with highly reflecting material, such as chromium plate. The resulting effect is a flickering appearance which has an effective attraction for fish and which, in practice, has resulted in the bait being an efficient fish-getter.

What I claim is:

1. A fish lure including an elongated substantially flat supporting link, and a wobble member loosely mounted on said link, said wobble member being approximately V-shaped in side elevation and comprising a pair of angularly disposed substantially flat diverging wings joined at one end and thereby forming an apex, said wobble member having an elongated substantially rectangular aperture at said apex extending transversely of said member and said link passing through said aperture and loosely fitting therein.

2. A fish lure including an elongated substantially flat supporting link, and a wobble member loosely mounted on said link, said wobble member being approximately V-shaped in side elevation, and comprising a pair of angularly disposed substantially flat diverging wings joined at one end and thereby forming an apex, said wobble member having an elongated substantially rectangular aperture at said apex extending transversly of said member, said link passing through said aperture and loosely fitting therein, said link near one of its ends having a reduced width nose portion forming shoulders with the remainder of said link, said nose portion passing through said wobble member aperture, and said wobble member apex engaging said nose portion shoulders adjacent said aperture.

3. A fish lure including an elongated substantially flat supporting link, and a wobble member loosely mounted on said link, said wobble member being approximately V-shaped in side elevation and comprising a pair of angularly disposed substantially flat diverging wings joined at one end and thereby forming an apex, said wobble member having an elongated substantially rectangular aperture at said apex extending transversely of said member, said link passing through said aperture and loosely fitting therein and said link near its opposite ends having holes therein whereby said link is connected to the fishing line or spoon or hooks.

LOUIS J. EPPINGER.

References Cited in the file of this patent

UNITED STATES PATENTS

| Number | Name | Date |
|---|---|---|
| 1,297,354 | Jay | Mar. 18, 1919 |
| 1,738,617 | Scharrer | Dec. 10, 1929 |
| 1,934,158 | Yarvice | Nov. 7, 1933 |
| 2,000,734 | Accetta | May 7, 1935 |